Feb. 10, 1953 J. R. CLARK ET AL 2,627,847
POWER BOOST CONTROL SYSTEM WITH MECHANICAL FEEL MEANS THEREFOR
Filed June 22, 1948 3 Sheets-Sheet 1

INVENTOR.
John R. Clark
Carl Schultz
BY
M. B. Tasker
ATTORNEY

INVENTOR.
John R. Clark
Carl Schultz
BY
M. B. Tasker
ATTORNEY

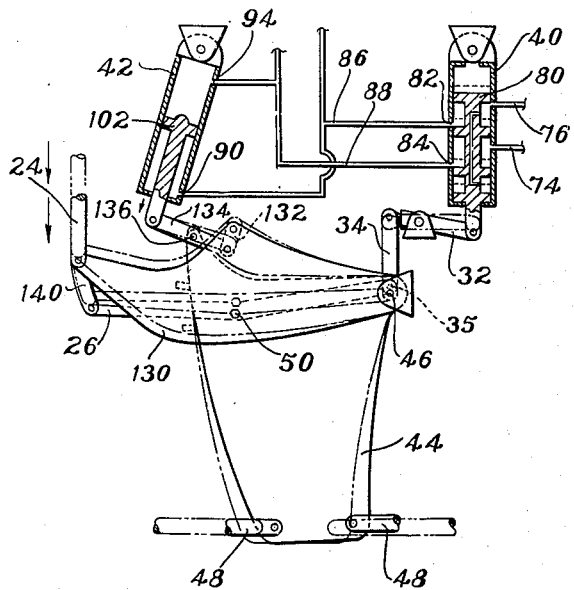
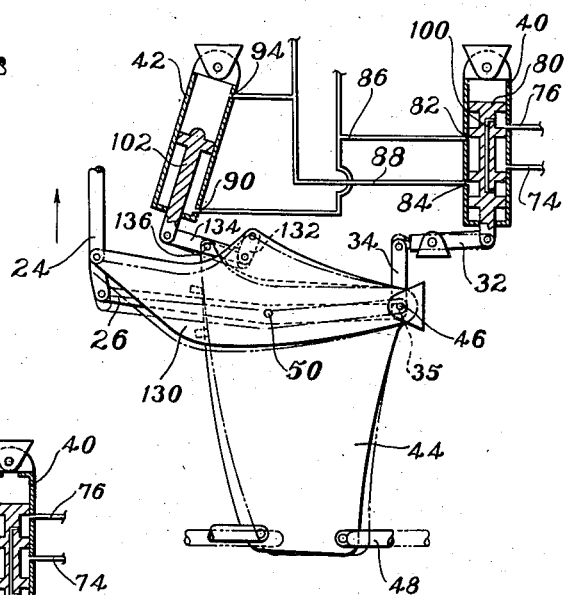
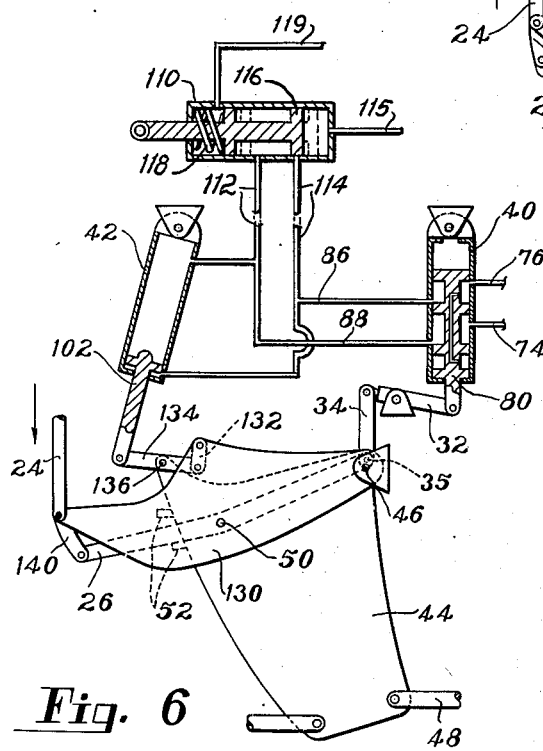

Patented Feb. 10, 1953

2,627,847

UNITED STATES PATENT OFFICE 2,627,847

POWER BOOST CONTROL SYSTEM WITH MECHANICAL FEEL MEANS THEREFOR

John R. Clark, Stratford, and Carl Schultz, Milford, Conn., assignors, by mesne assignments, to the United States of America as represented by the Secretary of the Navy Application June 22, 1948, Serial No. 34,465

2 Claims. (Cl. 121—41)

This invention relates to power boost control systems for aircraft surfaces such as rudders, ailerons, or elevators and more particularly to an improved boost mechanism for assisting in the operation of aircraft control surfaces by which the pilot retains a percentage of the load required to move the surfaces.

It is an object of this invention to provide an improved power boost control mechanism for aircraft wherein the pilot retains a certain proportion of the forces necessary to move the control surfaces.

A further object of this invention is to provide a power boost control system for aircraft which includes a distinct element for transmitting a percentage of the forces required to move the particular control surface to the pilot's control stick thereby providing a continuous resistance or "feel" throughout the entire range of operation.

A still further object of this invention is to provide an arrangement as described above wherein the booster mechanism is automatically disabled upon a predetermined drop in power or pressure so as to permit manual operation of the controls.

Another object of this invention is to provide a power boost mechanism for aircraft controls which includes a separate hydraulic or lever mechanism interconnected between the boost selector valve and the boost servo unit for imparting resistance forces on the pilot's stick to produce "feel" in proportion to the loads on the control surface, the relatively small forces during initial movement of the surface being transmittable directly to the pilot's control stick.

These and other objects and advantages will become readily apparent from the drawings and following description thereof which shows a preferred embodiment of this invention and which indicates modified arrangements for utilizing hydraulic or mechanical linkage to produce the desired "feel" in the pilot's control stick.

In the drawings,

Fig. 5 is a schematic view of Fig. 4 showing the position of the hydraulic units and linkages immediately after the pilot's control has been moved in one direction.

Fig. 6 is similar to Fig. 5 indicating the position of the mechanism when the pilot's control has reached an extreme position in the same direction as shown in Fig. 5; and Fig. 7 is similar to Figs. 5 and 6 but indicates the position of the respective parts when the pilot's control is moved opposite to that shown in Fig. 5.

It is to be understood that for purposes of explaining this novel mechanism the control system for the ailerons only will be described, it being understood that the construction and arrangement can be modified so as to operate any of the other aircraft control surfaces.

Figure 1:
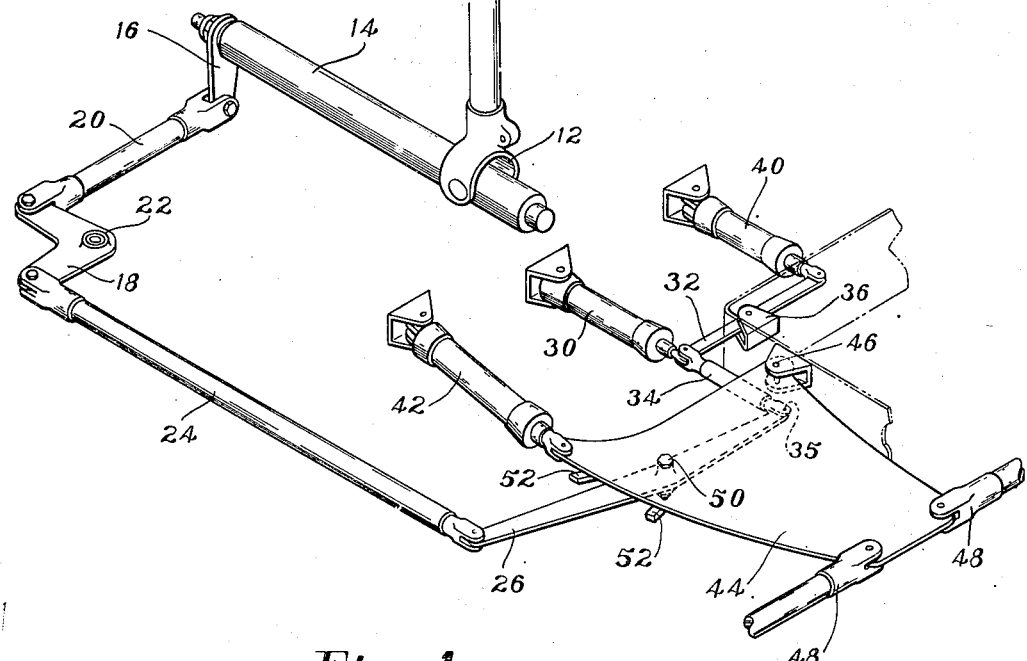
Fig. 1 is a detailed perspective view of a pilot's control stick and its interconnections with the power boost mechanism including a hydraulic reaction strut for producing the desired "feel" according to this invention.

Accordingly then, referring to Fig. 1, a conventional pilot's control stick 10 is shown having a lower forked fitting 12 which is pivotally connected to a torque tube 14 whose fore and aft ends are rotatably mounted to the aircraft structure. The torque tube 14 has an integral arm 16 disposed perpendicular to the axis of the tube and attached to one of the free ends of a bell crank 18 by a connector 20. The bell crank 18 which is pivotally attached to the airplane structure at the point 22 has its other free end connected to a push-pull rod 24 which in turn is also attached to the free end of a centrally pivoted arm 26. The opposite free end of the arm 26 is interconnected to a reaction strut 30 and a rocker arm 32 by means of a link rod 34 having the pivot connection 35 with the arm 26. The rocker arm 32 is pivotally supported intermediate its ends by a bracket 36, which is attached to the airplane structure, so that the other of its ends can be attached to the selector valve 40. Inasmuch as both the reaction strut 30 and the selector valve 40 are rigidly supported on the aircraft structure, movement of the rocker arm 32 will produce an inverse motion to the actuating ends of the strut 30 and the valve 40. The term reaction strut as used herein refers to a strut which provides a proportionate amount of reaction force to the pilot's control stick to produce "feel" when the boost system is in operation.

A power boost strut 42 is also provided having one end fastened to the airplane and its relatively free actuating end connected to one arm of a plate type bell crank 44 which has its pivoted end supported at 46 to the airplane structure and its other free end connected to the aileron control rods 48. It will be noted that the arm 26 has a central pivot 50 which connects it to the bell crank 44. A pair of stops 52 on the bell crank 44 provide for limited movement of the arm 26 relative to the bell crank 44.

Figure 2:
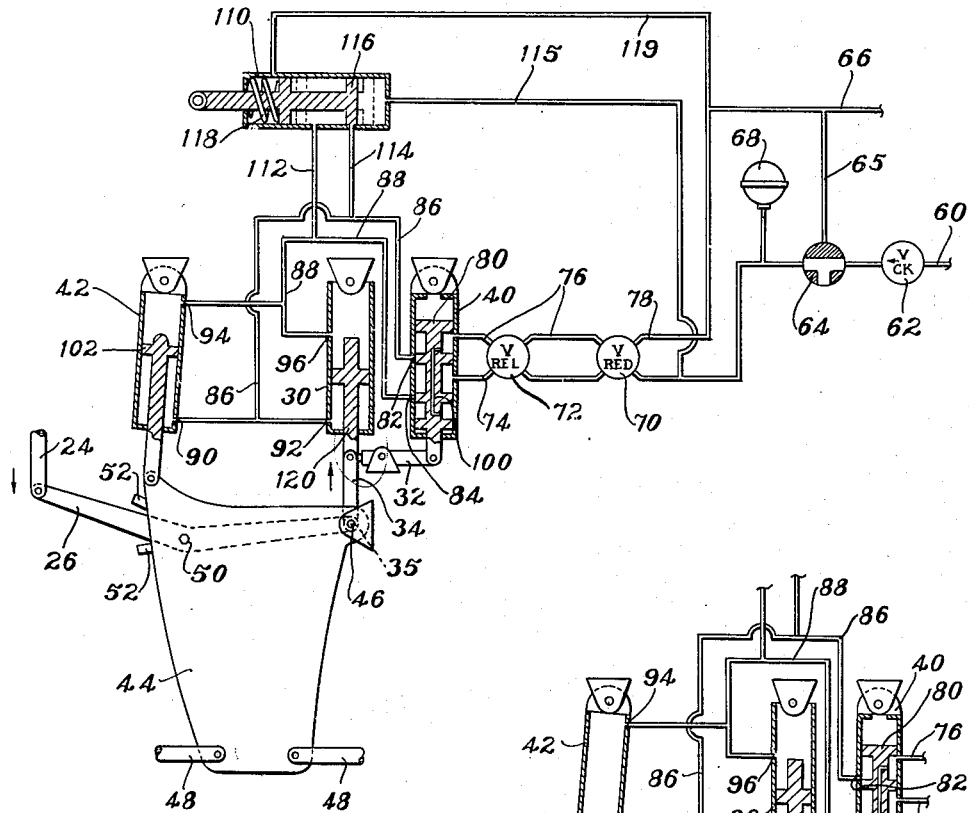
Fig. 2 is a schematic view of the mechanism shown in Fig. 1 and includes various hydraulic elements which complete the system.

As is more clearly seen in Fig. 2, each of the hydraulic units 30, 40, and 42 form the major elements of a hydraulic system. To this end hydraulic pressure from a pump or other source is admitted through the line 60 through the check valve 62 and thence to a three-way shut-off valve 64. The shut-off valve 64 operates in such a manner that when it is moved counterclockwise 90° from the position shown in Fig. 2 the hydraulic fluid under pressure will be directed through the line 65 to the return line 66. A hydraulic accumulator 68 is provided in order to eliminate surging and to maintain a steady pressure and to supply sufficient additional volume of fluid to the power boost system in the event that other hydraulic devices in the aircraft are in operation.

In aircraft having relatively high pressure hydraulic systems it may be necessary to provide a reducer valve 70 so that the pressure supplied to the boost system will not too greatly exceed the designed operable limits of the booster mechanism. In the event that the aircraft hydraulic system operates at pressures identical to that for which the units 30, 40 and 42 are designed the reducer valve may be eliminated. A relief valve 72 is also provided in order to closely regulate the hydraulic pressure being supplied through the line 74 to the selector valve 40. It should be noted that both the relief valve 72 and the reducer valve 70 have fluid connections 76 and 78, respectively, to the return line 66.

The selector valve 40 contains a piston 80 carrying a pair of lands for cooperating with the ports 82 and 84 which are in communication with the conduits 86 and 88, respectively. The conduit 86 connects with the lower passage 90 on the power boost strut 42 and also with port 92 on the hydraulic reaction strut 30. Conduit 88, on the other hand, connects to the port 94 on the upper end of the boost strut 42 and the port 96 on the upper end of the reaction strut 30.

The drilled passage 100 in the piston 80 of the valve 40 permits the lines 86 and 88, via the ports 82 and 84, to act either as pressure or return lines when the piston 80 of the valve 40 is directing fluid to the power boost strut 42 during actuation of the piston 102 toward an extended or retracted position.

An emergency by-pass valve 110 is shunted across the lines 86 and 88 by conduits 112 and 114. The by-pass 110 contains a piston 116 which is biased towards the dotted line position by a spring 118 and is forced into the solid line position shown by pressurized fluid from either line 114 or line 115 depending on the direction of action. Pressure from the system is ordinarily sufficient to overcome the force of spring 118. When in the dotted line position the piston 116 allows fluid to flow from the conduit 112 to the conduit 114 or vice versa, thereby permitting communication between the pressure and return lines in the system and producing a free circulation of fluid in the boost system. The line 119 shown leading from the area behind the normal operating area of the by-pass valve 110 is utilized to bleed off and convey back to the hydraulic system any fluid that might become locked past the lands of the piston 116. It is obvious then that the piston 102 on the boost strut 42 and the piston 120 in the reaction strut 30 under the aforementioned condition will be free to move in any direction. In a boost system that operated for example at about 800 p. s. i., the by-pass valve would be set to open whenever the pressure drops below say 375 p. s. i. This feature has the advantage of permitting automatic change over from a power boost control to a manual control in the event of loss of hydraulic pressure. If a by-pass were not provided, the trapped hydraulic system would not allow the piston in the struts to move and, of course, the system would be locked and manual operation would be impossible. The emergency by-pass will also go into operation when the pressure is shut-off manually by the pilot operated three-way valve 64.

In operation then when the pilot moves the stick to the right, the push-pull rod 24 will be moved downwardly as seen in Fig. 2. Initially the first increment of movement will cause the arm 26 to rotate counterclockwise about its pivot 50 thereby forcing the link 34 upwardly. As the link 34 is moved, the piston 120 in the reaction strut 30 will also move upwardly and the piston 80 in the valve 40 will begin to move downwardly. The initial movement of the piston in the reaction strut 30 will force fluid through the passage 96 and across to the upper passage 94 in the power boost strut 42 thereby causing the piston 102 to begin moving downwardly. At the same time, the piston 80 in the valve 40 will assume the position shown in Fig. 3. In this position of the valve piston 80 fluid under pressure is admitted through the line 74 thence through the passage 84 through line 88 and thereafter through the passage 94 on the power boost strut 42 to force the piston 102 downwardly. Since the piston 102 is connected to the bell crank 44 it will cause the latter to pivot about the point 46 and move the aileron control rods 48 to the right as indicated by the arrow in Fig. 3. It will be noted that although fluid pressure is being admitted via the line 88 to the port 94 on the power boost strut 42, a portion of the fluid is also being admitted through the port 96 on the reaction strut 30. The fluid pressure entering via the port 96 into the upper portion of the strut 30, therefore, tends to move the piston 120 downwardly causing the arm 26 to be forced in a clockwise direction about its pivot 50 in a counteracting tendency to the initial or continuing upward movements of link 34 caused by the downward movement of the pilot controlled push-pull rod 24. It is therefore apparent that during booster operation the reaction strut 30 tends to resist the movement of the rod 24 thereby transmitting "feel" to the pilot's control stick. The ratio of the areas of the pistons 102 and 120 in the boost strut 42 and the reaction strut 30 in cooperation with the ratio of the moments about the pivots of the arms operated by the boost strut 42 and the rod 24 determines the resultant ratio of the resistance force or "feel" in the pilot's control stick. It is further evident that the reaction strut 30 will tend to return the piston 80 in the valve 40 toward a neutral position after it has been displaced so that a continued exertion by the pilot is necessary to keep the boost strut 42 in operation in either direction.

As was previously mentioned, upon initial downward movement of rod 24 as controlled by the pilot's control stick, the piston in the reaction strut 30 is moved upwardly causing pressures which initiate the downward movement of the piston 102 of the boost strut 42. Following this, of course, as pressure is admitted from the selector valve 40 the piston in the reaction strut will tend to exert pressure opposite to this initial movement to produce resistance to movement by the pilot. This point is brought out to indicate that the pilot obtains a definite "feel" on the control stick immediately upon application of any force since a certain amount of pressure must be exerted during the aforementioned initial movement of the piston in the reaction strut 30.

Figure 3:
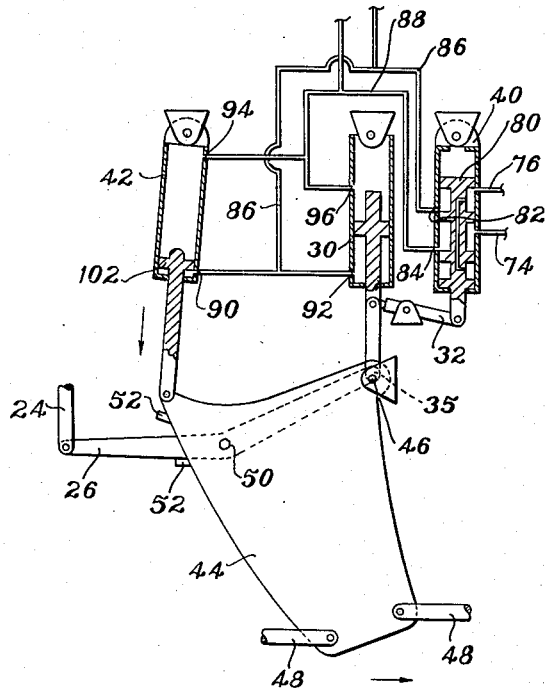
Fig. 3 is a schematic view of a portion of the mechanism shown in Fig. 2 indicating the position of the elements when the control has been moved to one extremity.

As seen in Fig. 3, when the piston 102 in the boost strut 42 reaches its extreme down position the arm 26 has approached one of the stops 52 on the bell crank 44. An actual abutting position of the arm 26 with the stops 52 is assumed by these members whenever the hydraulic boost is not in operation. In other words, in a purely mechanical operation there will be little or no resistance to movement of the rod 24 so that the arm 26 will move almost completely through its limited lost motion by approaching the stop 52. When there is no hydraulic pressure in the system, the arm 26 will actually abut the stops 52 and will, upon subsequent movement, commence to rotate the bell crank 44 to operate the aileron control rods 48.

Figure 4:
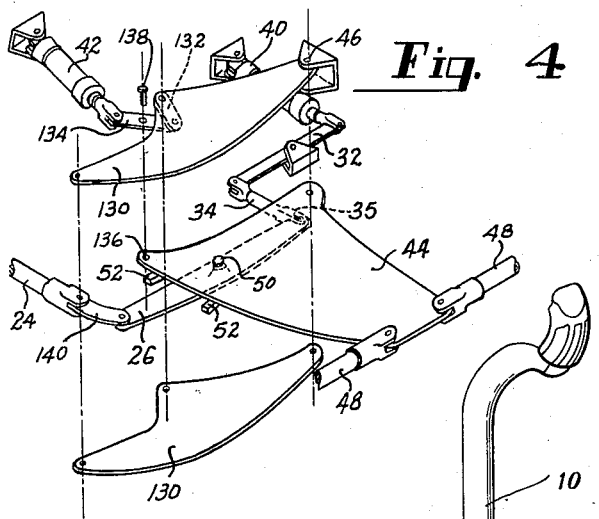
Fig. 4 is a detailed perspective view similar to Fig. 1 and indicates a modified structure which utilizes a mechanical "feel" system in connection with the power boost mechanism.

The hydraulic reaction strut 30 may be replaced with a mechanical "feel" system according to the modification shown in Fig. 4. For this purpose a set of plates 130 are pivotally mounted to the airplane structure as is the bell crank 44 by means of the pivot connection 46. The free ends of the plates 130 are in turn attached to the end of the rod 24 which is actuated by the pilot's control stick. Intermediate their attachment to the rod 24 and the pivot connection 46, the plates 130 carry a toggle link 132 which is interconnected to the lever 134. This lever 134 serves to connect the plates 130 to the bell crank 44 and the power boost strut 42. The bell crank 44 has its free end 136 attached to the lever 134 by means of the pin 138 while the lever 134, on the other hand, has one end connected to the boost strut 42 and the other end attached to the toggle link 132.

Inasmuch as the rod 24 is now interconnected to the bell crank 44 by the plates 130, it is necessary that an extension link 140 be provided in order to permit the arm 26 to pivot about the point 50.

As seen in Fig. 5, when the pilot moves the control stick 10 to the right the push-pull rod 24 will be moved downwardly thereby moving the piston 80 in the valve 40 downwardly from the dotted to the full line position by means of its connection to the arm 26, link 34, and rocker arm 32. Initially, however, the plates 130 will rotate about the pivot 46 and through the toggle link 132 and the lever 134 will cause a reduced rotation of bell crank 44 about the pivot 46; the lower attaching connection on the piston 102 of strut 42 being a fixed reaction point until a flow of hydraulic fluid under pressure is obtained. Subsequently, fluid under pressure will then be conducted from the port 84 via the line 88 to the port 94 on the boost strut 42 causing the piston 102 to move downwardly also. It will be noted, however, that as the rod 24 moves downwardly the plates 130 will be pivoted counterclockwise about the connection 46 so that through the toggle link 132 a force will be applied to one end of the lever 134 at the same time that the piston 102 on the boost strut 42 is exerting a force at the other end of the lever 134. The final result is that both pilot exerted forces and hydraulic boost strut forces will be applied to the free end 136 of the bell crank 44 tending to move the aileron control rods 48 and the entire mechanism from the dotted line to the full line position shown in Fig. 5. When the pilot relaxes the forces he is exerting on the control stick, the boost strut 42 continues to exert force on one end of the lever 134 thereby causing a reversed movement to the link 132 and the plates 130 which through their connection to link 140, arm 26, link 34 and rocker arm 32 will return the piston 80 in the valve 40 toward a neutral position.

The ratio of the force exerted by the pilot to that exerted by the power boost strut is dependent upon the moments about the pivot connection 46. Thus, for example, a given downward force on the rod 24 about the pivot 46 will exert a somewhat higher force on the lever 134 via the link 132 due to the lever advantage afforded by the plates 130. At the same time, the piston 102 of the boost strut 42 also exerts a force on the lever 134 through its moment arm tending to rotate the bell crank 44 about its pivot 46. The various lengths of these linkages can be so designed to give any ratio of forces between the boost strut and the manually controlled rod 24. It is thus possible to cause a continuous proportionate load to be felt by the pilot throughout the entire range of control.

Referring now to Fig. 6, the relative positions of the mechanism elements are shown after the controls have reached the extreme position in the direction of movement indicated in Fig. 5. The position of the piston 80 in the valve 40 under these conditions remains the same while the piston 102 of the boost strut 42 has reached its fully extended position.

The arm 26 will abut the stop 52 on the bell crank 44 for direct manual operation should at any time the boost system fail or be shut off since the by-pass valve 110 will open permitting operation in the same manner as previously described in connection with the hydraulic feel system.

When the pilot moves the control stick 10 to the left the operation of the boost mechanism is reversed so that the various elements of the boost system will move from the dotted to the full line position shown in Fig. 7. During this operation, the piston 80 in the valve 40 moves in the opposite direction so that the line 88 now becomes a return line and the line 86 conducts fluid under pressure to the port 90 of the boost strut 42. It will be noted that in this position of the valve the return fluid passes through the port 84 thence upwardly through the passage 100 and out to the return line 76. Thus it can be seen that the lines 86 and 88 are able to operate either as pressure or return lines depending on the desired direction of movement with the piston 102 in the boost strut 42.

It is readily apparent that as a result of this invention an improved airplane control boost mechanism has been provided which allows the pilot to maintain a definite ratio of "feel" in the control stick throughout the range of operation.

In addition, this improved mechanism allows the pilot to select manual or booster operation of the control system while at the same time provides a safety device for automatically disabling the boost system in the event of power failure.

Further, this novel mechanism provides a system wherein the pilot's "feel" can be obtained by either hydraulic or mechanical means through a separate element which cooperates with the movement of the boost strut and the control stick to provide a proportional force resisting movement of the stick.

While only certain preferred embodiments of this invention have been shown it will be evident that various changes and modifications can be made without departing from the scope of this novel concept.

What it is desired by Letters Patent is:

1. In a boost control mechanism for controlling movable control surfaces of aircraft, a manually actuated means connected to one end of a first lever, said first lever being pivoted at an intermediate point to a bell-crank, said bell-crank being pivotally supported by a fixed member and connected to a pair of control rods, two stops on said bell-crank, said stops being selectively engageable with said first lever upon predetermined relative movement of said bell-crank and said first lever, selective means connected to the other end of said first lever, a booster servo-motor, a fluid power source for operating said servo-motor under control of said selective means, means to automatically render said servo-motor inoperative upon loss of power from said source, a toggle including a second lever pivoted at an intermediate point to said bell-crank, one end of said second lever being connected to said servo-motor and the other end being connected through a toggle link to an intermediate point on a plate being pivoted coaxially with said bell-crank to a fixed member at one end and connected at its other end to said manually actuated means, said servo-motor when operative creating a resistance to manual operation of said mechanism.

2. In a boost control mechanism for controlling movable control surfaces of aircraft, a manually actuated means connected to one end of a first lever, said first lever being pivoted at an intermediate point to a bell-crank, said bell-crank being pivotally supported by a fixed member and connected to a pair of control rods, two stops on said bell-crank, said stops being selectively engageable with said first lever upon predetermined relative movement of said bell-crank and said first lever, selective means connected to the other end of said first lever, a booster servo-motor, a fluid power source for operating said servo-motor under control of said selective means, said servo-motor being operated in opposite directions by fluid power supplied through two conduits connected to said selective means, means to automatically render said servo-motor inoperative upon loss of power from said source, said automatic means including a spring-biased by-pass valve adapted to connect said two conduits, a toggle including a second lever pivoted at an intermediate point to said bell-crank, one end of said second lever being connected to said servo-motor and the other being connected through a toggle link to an intermediate point on a plate, said plate being pivoted coaxially with said bell-crank to a fixed member at one end and connected at its other end to said manually actuated means, said servo-motor when operative creating a force which tends to pivot said second lever about its intermediate pivot oppositely to the force created by manual operation of said mechanism thereby creating a resistance to manual operation of said mechanism.

JOHN R. CLARK.
CARL SCHULTZ.

REFERENCES CITED

The following references are of record in the file of this patent:

UNITED STATES PATENTS

| Number | Name | Date |
| --- | --- | --- |
| 1,516,164 | Vickers | Nov. 18, 1924 |
| 2,141,697 | Russell | Dec. 27, 1938 |
| 2,227,375 | Carlson | Dec. 31, 1940 |
| 2,282,053 | Hey | May 5, 1942 |
| 2,283,541 | Dodson | May 19, 1942 |
| 2,284,298 | Newton | May 26, 1942 |
| 2,454,551 | Carlson | Nov. 23, 1948 |
| 2,462,994 | Price | Mar. 1, 1949 |

FOREIGN PATENTS

| Number | Country | Date |
| --- | --- | --- |
| 670,085 | France | Aug. 12, 1929 |